US008707354B1

(12) United States Patent
Moreau et al.

(10) Patent No.: US 8,707,354 B1
(45) Date of Patent: *Apr. 22, 2014

(54) GRAPHICALLY RICH, MODULAR, PROMOTIONAL TILE INTERFACE FOR INTERACTIVE TELEVISION

(75) Inventors: Samuel Moreau, Mill Valley, CA (US); Darrell Haber, Martinez, CA (US); Kathryn Jaroneski, Los Angeles, CA (US); Christine Hirsch, San Francisco, CA (US); Georgia Gibbs, Mill Valley, CA (US)

(73) Assignee: TVWorks, LLC, Philadelphia, PA (US)

( * ) Notice: Subject to any disclaimer, the term of this patent is extended or adjusted under 35 U.S.C. 154(b) by 1040 days.

This patent is subject to a terminal disclaimer.

(21) Appl. No.: 10/460,950

(22) Filed: Jun. 12, 2003

Related U.S. Application Data

(60) Provisional application No. 60/388,493, filed on Jun. 12, 2002.

(51) Int. Cl.
*G06F 3/00* (2006.01)
(52) U.S. Cl.
USPC .......................................................... 725/37
(58) Field of Classification Search
USPC ................................................... 725/39–61
See application file for complete search history.

(56) References Cited

U.S. PATENT DOCUMENTS

| 5,287,489 | A |   | 2/1994  | Nimmo et al.      |
|-----------|---|---|---------|-------------------|
| 5,321,750 | A |   | 6/1994  | Nadan             |
| 5,485,221 | A |   | 1/1996  | Banker et al.     |
| 5,583,563 | A |   | 12/1996 | Wanderscheid et al. |
| 5,589,892 | A | * | 12/1996 | Knee et al. ........................ 725/43 |
| 5,592,551 | A |   | 1/1997  | Lett et al.       |
| 5,594,509 | A |   | 1/1997  | Florin et al.     |
| 5,613,057 | A |   | 3/1997  | Caravel           |
| 5,621,456 | A |   | 4/1997  | Florin et al.     |
| 5,657,072 | A |   | 8/1997  | Aristides et al.  |
| 5,659,793 | A |   | 8/1997  | Escobar et al.    |
| 5,666,645 | A |   | 9/1997  | Thomas et al.     |
| 5,675,752 | A |   | 10/1997 | Scott et al.      |
| 5,694,176 | A |   | 12/1997 | Bruette et al.    |
| 5,826,102 | A |   | 10/1998 | Escobar et al.    |
| 5,844,620 | A |   | 12/1998 | Coleman et al.    |
| 5,850,218 | A |   | 12/1998 | LaJoie et al.     |
| 5,852,435 | A |   | 12/1998 | Vigneaux et al.   |
| 5,860,073 | A |   | 1/1999  | Ferrel et al.     |

(Continued)

FOREIGN PATENT DOCUMENTS

| EP | 0624039 A2 | 11/1994 |
| EP | 0963115 A1 | 12/1999 |

(Continued)

OTHER PUBLICATIONS

Fernando Pereira, "The MPEG-4 Book", Prentice Hall, Jul. 10, 2002.

(Continued)

*Primary Examiner* — Nathan Flynn
*Assistant Examiner* — Alfonso Castro
(74) *Attorney, Agent, or Firm* — Banner & Witcoff, Ltd.

(57) ABSTRACT

A user interface arranged as hierarchical grid of tiles configurable to be individually and dynamically programmed for both content type and content placement according to a set of rules defining content placement and display specified by a content controller.

24 Claims, 11 Drawing Sheets

(56) References Cited

U.S. PATENT DOCUMENTS

| | | | |
|---|---|---|---|
| 5,883,677 A | 3/1999 | Hofmann | |
| 5,892,902 A | 4/1999 | Clark | |
| 5,892,905 A | 4/1999 | Brandt et al. | |
| 5,905,492 A | 5/1999 | Straub et al. | |
| 5,929,849 A | 7/1999 | Kikinis | |
| 5,990,890 A | 11/1999 | Etheredge | |
| 5,996,025 A | 11/1999 | Day et al. | |
| 6,002,394 A | 12/1999 | Schein et al. | |
| 6,005,561 A | 12/1999 | Hawkins et al. | |
| 6,008,803 A | 12/1999 | Rowe et al. | |
| 6,008,836 A | 12/1999 | Bruck et al. | |
| 6,016,144 A * | 1/2000 | Blonstein et al. | 715/791 |
| 6,025,837 A | 2/2000 | Matthews, III et al. | |
| 6,049,823 A | 4/2000 | Hwang | |
| 6,061,695 A | 5/2000 | Slivka et al. | |
| 6,067,108 A | 5/2000 | Yokote et al. | |
| 6,088,722 A | 7/2000 | Herz et al. | |
| 6,091,411 A | 7/2000 | Straub et al. | |
| 6,094,237 A * | 7/2000 | Hashimoto | 348/731 |
| 6,141,003 A | 10/2000 | Chor et al. | |
| 6,148,081 A | 11/2000 | Szymanski et al. | |
| 6,162,697 A | 12/2000 | Singh et al. | |
| 6,169,543 B1 | 1/2001 | Wehmeyer | |
| 6,172,677 B1 | 1/2001 | Stautner et al. | |
| 6,177,931 B1 | 1/2001 | Alexander et al. | |
| 6,191,781 B1 | 2/2001 | Chaney et al. | |
| 6,195,692 B1 | 2/2001 | Hsu | |
| 6,205,582 B1 | 3/2001 | Hoarty | |
| 6,219,839 B1 | 4/2001 | Sampsell | |
| 6,239,795 B1 | 5/2001 | Ulrich et al. | |
| 6,240,555 B1 | 5/2001 | Shoff et al. | |
| 6,292,187 B1 | 9/2001 | Gibbs et al. | |
| 6,292,827 B1 | 9/2001 | Raz | |
| 6,295,057 B1 | 9/2001 | Rosin et al. | |
| 6,314,569 B1 | 11/2001 | Chernock et al. | |
| 6,317,885 B1 | 11/2001 | Fries | |
| 6,345,305 B1 | 2/2002 | Beck et al. | |
| 6,405,239 B1 | 6/2002 | Addington et al. | |
| 6,415,438 B1 | 7/2002 | Blackketter et al. | |
| 6,421,067 B1 | 7/2002 | Kamen et al. | |
| 6,426,779 B1 | 7/2002 | Noguchi et al. | |
| 6,442,755 B1 | 8/2002 | Lemmons et al. | |
| 6,477,705 B1 | 11/2002 | Yuen et al. | |
| 6,486,920 B2 | 11/2002 | Arai et al. | |
| 6,522,342 B1 | 2/2003 | Gagnon et al. | |
| 6,529,950 B1 | 3/2003 | Lumelsky et al. | |
| 6,532,589 B1 | 3/2003 | Proehl et al. | |
| 6,564,263 B1 | 5/2003 | Bergman et al. | |
| 6,567,104 B1 * | 5/2003 | Andrew et al. | 715/762 |
| 6,571,392 B1 | 5/2003 | Zigmond et al. | |
| 6,591,292 B1 | 7/2003 | Morrison et al. | |
| 6,621,509 B1 * | 9/2003 | Eiref et al. | 715/836 |
| 6,636,887 B1 | 10/2003 | Augeri | |
| 6,658,661 B1 | 12/2003 | Arsenault et al. | |
| 6,678,891 B1 | 1/2004 | Wilcox et al. | |
| 6,684,400 B1 | 1/2004 | Goode et al. | |
| 6,731,310 B2 | 5/2004 | Craycroft et al. | |
| 6,760,043 B2 | 7/2004 | Markel | |
| 6,763,522 B1 | 7/2004 | Kondo et al. | |
| 6,766,526 B1 | 7/2004 | Ellis | |
| 6,806,887 B2 * | 10/2004 | Chernock et al. | 345/629 |
| 6,857,128 B1 | 2/2005 | Borden, IV et al. | |
| 6,910,191 B2 | 6/2005 | Segerberg et al. | |
| 6,918,131 B1 | 7/2005 | Rautila et al. | |
| 7,028,327 B1 | 4/2006 | Dougherty et al. | |
| 7,065,785 B1 | 6/2006 | Shaffer et al. | |
| 7,103,904 B1 | 9/2006 | Blackketter et al. | |
| 7,114,170 B2 | 9/2006 | Harris et al. | |
| 7,152,236 B1 | 12/2006 | Wugofski et al. | |
| 7,162,694 B2 | 1/2007 | Venolia | |
| 7,162,697 B2 | 1/2007 | Markel | |
| 7,197,715 B1 | 3/2007 | Valeria | |
| 7,207,057 B1 | 4/2007 | Rowe | |
| 7,213,005 B2 | 5/2007 | Mourad et al. | |
| 7,221,801 B2 | 5/2007 | Jang et al. | |
| 7,237,252 B2 | 6/2007 | Billmaier | |
| 7,305,696 B2 | 12/2007 | Thomas et al. | |
| 7,337,457 B2 | 2/2008 | Pack et al. | |
| 7,360,232 B2 | 4/2008 | Mitchell | |
| 7,363,612 B2 | 4/2008 | Satuloori et al. | |
| 7,406,705 B2 | 7/2008 | Crinon et al. | |
| 7,440,967 B2 | 10/2008 | Chidlovskii | |
| 7,464,344 B1 | 12/2008 | Carmichael et al. | |
| 7,516,468 B1 | 4/2009 | Deller et al. | |
| 7,523,180 B1 | 4/2009 | DeLuca et al. | |
| 7,587,415 B2 | 9/2009 | Gaurav et al. | |
| 7,640,487 B2 | 12/2009 | Amielh-Caprioglio et al. | |
| 7,702,315 B2 | 4/2010 | Engstrom et al. | |
| 7,703,116 B1 | 4/2010 | Moreau et al. | |
| 7,721,307 B2 | 5/2010 | Hendricks et al. | |
| 7,743,330 B1 | 6/2010 | Hendricks et al. | |
| 7,752,258 B2 | 7/2010 | Lewin et al. | |
| 7,958,528 B2 | 6/2011 | Moreau et al. | |
| 8,266,652 B2 | 9/2012 | Roberts et al. | |
| 8,296,805 B2 | 10/2012 | Tabatabai et al. | |
| 8,365,230 B2 | 1/2013 | Chane et al. | |
| 2001/0014206 A1 | 8/2001 | Artigalas et al. | |
| 2001/0027563 A1 * | 10/2001 | White et al. | 725/46 |
| 2001/0049823 A1 | 12/2001 | Matey | |
| 2001/0056573 A1 | 12/2001 | Kovac et al. | |
| 2001/0056577 A1 | 12/2001 | Gordon et al. | |
| 2002/0010928 A1 | 1/2002 | Sahota | |
| 2002/0016969 A1 | 2/2002 | Kimble | |
| 2002/0023270 A1 | 2/2002 | Thomas et al. | |
| 2002/0026642 A1 | 2/2002 | Augenbraun et al. | |
| 2002/0041104 A1 | 4/2002 | Graf et al. | |
| 2002/0042915 A1 | 4/2002 | Kubischta et al. | |
| 2002/0059094 A1 * | 5/2002 | Hosea et al. | 705/10 |
| 2002/0059586 A1 | 5/2002 | Carney et al. | |
| 2002/0059629 A1 | 5/2002 | Markel | |
| 2002/0067376 A1 * | 6/2002 | Martin et al. | 345/810 |
| 2002/0069407 A1 | 6/2002 | Fagnani et al. | |
| 2002/0070978 A1 | 6/2002 | Wishoff et al. | |
| 2002/0078444 A1 | 6/2002 | Krewin et al. | |
| 2002/0083450 A1 | 6/2002 | Kamen et al. | |
| 2002/0100041 A1 | 7/2002 | Rosenberg et al. | |
| 2002/0107973 A1 | 8/2002 | Lennon et al. | |
| 2002/0108122 A1 | 8/2002 | Alao et al. | |
| 2002/0124254 A1 | 9/2002 | Kikinis | |
| 2002/0144269 A1 | 10/2002 | Connelly | |
| 2002/0144273 A1 | 10/2002 | Reto | |
| 2002/0147645 A1 | 10/2002 | Alao et al. | |
| 2002/0152477 A1 | 10/2002 | Goodman et al. | |
| 2002/0156839 A1 | 10/2002 | Peterson et al. | |
| 2002/0169885 A1 | 11/2002 | Alao et al. | |
| 2002/0170059 A1 | 11/2002 | Hoang | |
| 2002/0171691 A1 | 11/2002 | Currans et al. | |
| 2002/0171940 A1 | 11/2002 | He et al. | |
| 2002/0184629 A1 | 12/2002 | Sie et al. | |
| 2002/0188944 A1 * | 12/2002 | Noble | 725/39 |
| 2002/0196268 A1 | 12/2002 | Wolff et al. | |
| 2002/0199190 A1 | 12/2002 | Su | |
| 2003/0001880 A1 | 1/2003 | Holtz et al. | |
| 2003/0005444 A1 | 1/2003 | Crinon et al. | |
| 2003/0005453 A1 | 1/2003 | Rodriguez et al. | |
| 2003/0014752 A1 | 1/2003 | Zaslavsky et al. | |
| 2003/0014753 A1 | 1/2003 | Beach et al. | |
| 2003/0018755 A1 | 1/2003 | Masterson et al. | |
| 2003/0023970 A1 | 1/2003 | Panabaker | |
| 2003/0025832 A1 | 2/2003 | Swart et al. | |
| 2003/0028873 A1 | 2/2003 | Lemmons | |
| 2003/0041104 A1 | 2/2003 | Wingard et al. | |
| 2003/0051246 A1 | 3/2003 | Wilder et al. | |
| 2003/0056216 A1 | 3/2003 | Wugofski et al. | |
| 2003/0056218 A1 | 3/2003 | Wingard et al. | |
| 2003/0058948 A1 | 3/2003 | Kelly et al. | |
| 2003/0066081 A1 | 4/2003 | Barone et al. | |
| 2003/0067554 A1 | 4/2003 | Klarfeld et al. | |
| 2003/0070170 A1 | 4/2003 | Lennon | |
| 2003/0079226 A1 | 4/2003 | Barrett | |
| 2003/0084443 A1 | 5/2003 | Laughlin et al. | |
| 2003/0084444 A1 | 5/2003 | Ullman et al. | |
| 2003/0084449 A1 | 5/2003 | Chane et al. | |
| 2003/0086694 A1 | 5/2003 | Davidsson | |

(56) References Cited

U.S. PATENT DOCUMENTS

| | | |
|---|---|---|
| 2003/0093790 A1 | 5/2003 | Logan et al. |
| 2003/0093792 A1 | 5/2003 | Labeeb et al. |
| 2003/0097657 A1 | 5/2003 | Zhou et al. |
| 2003/0110503 A1 | 6/2003 | Perkes |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |
| 2003/0140097 A1 | 7/2003 | Schloer |
| 2003/0151621 A1 | 8/2003 | McEvilly et al. |
| 2003/0172370 A1 | 9/2003 | Satuloori et al. |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1* | 10/2003 | Breen et al. ............ 725/39 |
| 2003/0204854 A1 | 10/2003 | Blackketter et al. |
| 2003/0229899 A1 | 12/2003 | Thompson et al. |
| 2004/0003402 A1 | 1/2004 | McKenna |
| 2004/0019900 A1 | 1/2004 | Knightbridge et al. |
| 2004/0031015 A1 | 2/2004 | Ben-Romdhane et al. |
| 2004/0039754 A1 | 2/2004 | Harple |
| 2004/0078814 A1* | 4/2004 | Allen ............ 725/47 |
| 2004/0107437 A1 | 6/2004 | Reichardt et al. |
| 2004/0107439 A1 | 6/2004 | Hassell et al. |
| 2004/0133923 A1 | 7/2004 | Watson et al. |
| 2004/0136698 A1 | 7/2004 | Mock |
| 2004/0172648 A1 | 9/2004 | Xu et al. |
| 2004/0194136 A1* | 9/2004 | Finseth et al. ............ 725/39 |
| 2004/0221306 A1 | 11/2004 | Noh |
| 2004/0226051 A1 | 11/2004 | Carney et al. |
| 2005/0005288 A1 | 1/2005 | Novak |
| 2005/0015804 A1 | 1/2005 | LaJoie et al. |
| 2005/0086172 A1 | 4/2005 | Stefik |
| 2005/0149972 A1 | 7/2005 | Knudson |
| 2005/0155063 A1 | 7/2005 | Bayrakeri et al. |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0059525 A1 | 3/2006 | Jerding et al. |
| 2006/0080707 A1 | 4/2006 | Laksono |
| 2006/0206912 A1 | 9/2006 | Klarfeld et al. |
| 2006/0248572 A1* | 11/2006 | Kitsukama et al. ........ 725/135 |
| 2007/0271587 A1 | 11/2007 | Rowe |
| 2008/0037722 A1 | 2/2008 | Klassen |
| 2008/0060011 A1 | 3/2008 | Kelts |
| 2008/0189740 A1* | 8/2008 | Carpenter et al. ............ 725/38 |
| 2008/0196070 A1* | 8/2008 | White et al. ............ 725/87 |
| 2008/0235725 A1 | 9/2008 | Hendricks |
| 2008/0276278 A1 | 11/2008 | Krieger et al. |
| 2008/0288644 A1 | 11/2008 | Gilfix et al. |
| 2009/0019485 A1* | 1/2009 | Ellis et al. ............ 725/40 |
| 2009/0024629 A1 | 1/2009 | Miyauchi |
| 2009/0094632 A1 | 4/2009 | Newnam et al. |
| 2009/0164904 A1 | 6/2009 | Horowitz et al. |
| 2009/0222872 A1 | 9/2009 | Schlack |
| 2009/0228441 A1 | 9/2009 | Sandvik |
| 2009/0292548 A1 | 11/2009 | Van Court |
| 2010/0175084 A1 | 7/2010 | Ellis et al. |
| 2010/0223640 A1 | 9/2010 | Reichardt et al. |
| 2010/0251284 A1 | 9/2010 | Ellis et al. |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0209180 A1 | 8/2011 | Ellis et al. |
| 2011/0214143 A1 | 9/2011 | Rits et al. |
| 2011/0219419 A1 | 9/2011 | Reisman |

FOREIGN PATENT DOCUMENTS

| | | |
|---|---|---|
| EP | 1058999 B1 | 4/2003 |
| EP | 1080582 B1 | 5/2003 |
| GB | 2323489 A | 9/1998 |
| WO | 9963757 A1 | 12/1999 |
| WO | 0011869 A1 | 3/2000 |
| WO | 0033576 A1 | 6/2000 |
| WO | WO 0110115 A1 * | 2/2001 |
| WO | 0182613 A1 | 11/2001 |
| WO | 02063426 A2 | 8/2002 |
| WO | 02063471 A2 | 8/2002 |
| WO | 02063851 A2 | 8/2002 |
| WO | 02063878 A2 | 8/2002 |
| WO | 03009126 A1 | 1/2003 |
| WO | 03026275 A2 | 3/2003 |

OTHER PUBLICATIONS

Michael Adams, "Open Cable Architecture", Cisco Press, Dec. 3, 1999.

Andreas Kraft and Klaus Hofrichter, "An Approach for Script-Based Broadcast Application Production", Springer-Verlag Brling Heidelberg, pp. 74-82, 1999.

Mark Riehl, "XML and Perl", Sams, Oct. 16, 2002.

Sylvain Devillers, "Bitstream Syntax Definition Language: an Input to MPEG-21 Content Representation", Mar. 2001, ISO, ISO/IEC JTC1/SC29/WG11 MPEG01/M7053.

Yoon, et al., "Video Gadget: MPET-7 Based Audio-Visual Content Indexing and Browsing Engine", LG Electronics Institute of Technology, pp. 59-68, Mar. 22, 2001.

Watchwith webpage; http://www.watchwith.com/content_owners/watchwith_plalform_components.jsp (last visited Mar. 12, 2013).

Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).

"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).

MetaTV, Inc., PCT/US02/29917 filed Sep. 19, 2002, International Search Report dated Apr. 14, 2003; ISA/US; 6 pages.

Shim, et al., "A SMIL Based Graphical Interface for Interactive TV", Internet Tech. Laboratory Dept. of Comp. Engineering, San Jose State University, pp. 257-266, 2003.

\* cited by examiner

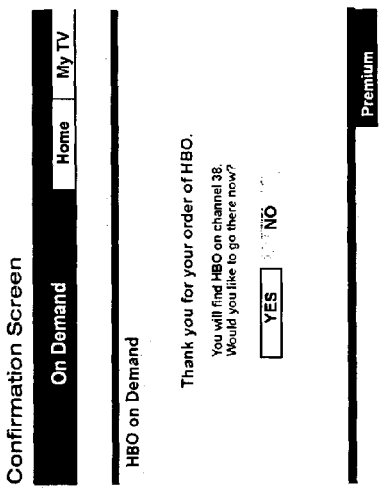
FIG. 10a
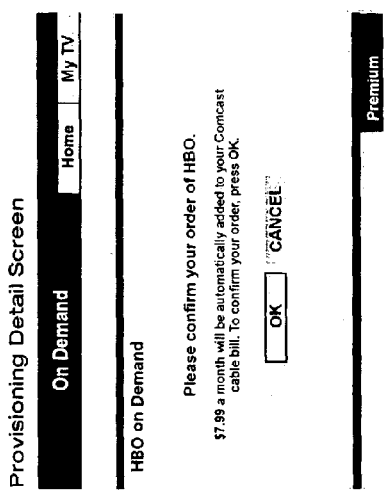
FIG. 10b
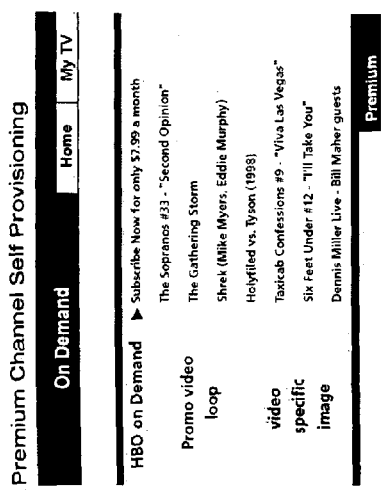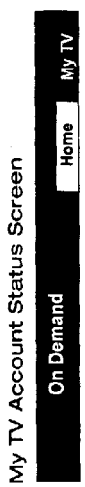
FIG. 10c
FIG. 10d

Broadcast TV

Broadcast TV

FIG. 11a

Current Time and Channel

| comcast. | | Channel 34 |
|---|---|---|
| SEARCH | 7:30 PM | |
| | Comcast On Demand | 8:00 PM  The Sopranos |
| | My Blue Heaven | See Last night's Episode |
| | Suzanne Summers | 9:00 PM  Path To War |
| | The Gift | 11:00 PM  Six Feet Under |
| | Sarah's Secrets | See Last week's Episode |
| | That 70's Show | 12:00 AM  Dennis Miller Live |
| | | 12:30 AM  Santimony |

FIG. 11b

Upcoming Program Guide

| comcast. | | Channel 34 |
|---|---|---|
| SEARCH | 7:30 PM | |
| | Comcast On Demand | 8:00 PM  The Sopranos |
| | My Blue Heaven | See Last night's Episode |
| | Suzanne Summers | 9:00 PM  Path To War |
| | The Gift | 11:00 PM  Six Feet Under |
| | Sarah's Secrets | See Last week's Episode |
| | That 70's Show | 12:00 AM  Dennis Miller Live |
| | | 12:30 AM  Santimony |

FIG. 11c

On Demand Listings By Show

| comcast. | | Channel 34 |
|---|---|---|
| SEARCH | 7:30 PM | |
| | Comcast On Demand | 8:00 PM  The Sopranos |
| | My Blue Heaven | ▶ See Last night's Episode |
| | Suzanne Summers | 9:00 PM  Path To War |
| | The Gift | 11:00 PM  Six Feet Under |
| | Sarah's Secrets | See Last week's Episode |
| | That 70's Show | 12:00 AM  Dennis Miller Live |
| | | 12:30 AM  Santimony |

FIG. 11d

On Demand Only Listing by Show

| comcast. | Comcast: On Demand |
|---|---|
| | HBO - The Sopranos |
| SEARCH  7:30 PM | "We're like leather and lace." That's how Tony's describes his relationship with Gloria to Dr. Melfi. |
| Comcast On Demand | ▶ #39: Army of One |
| My Blue Heaven | #38: Amour Fou |
| Suzanne Summers | #37: Pine Barrens |
| The Gift | #36: To Save...Satan's Power... |
| Sarah's Secrets | #35: The Telltale Moozadell |
| That 70's Show | #34: He Is Risen |
| | #33: Second Opinion |

FIG. 11e

On Demand Entry From IPG

| comcast. | Comcast: On Demand |
|---|---|
| SEARCH  7:30 PM | Movies |
| Comcast On Demand | ▶ Entertainment |
| My Blue Heaven | News |
| Suzanne Summers | Sports |
| | Kids |
| The Gift | Shopping |
| Sarah's Secrets | Lifestyle |
| That 70's Show | Premium |
| | Search |

| ER NBC | Friends NBC |
|---|---|
| Sopranos HBO | NHL Flyers |

FIG. 11f

GRAPHICALLY RICH, MODULAR, PROMOTIONAL TILE INTERFACE FOR INTERACTIVE TELEVISION

RELATED APPLICATIONS

The present application is related to, incorporates by reference and hereby claims the priority benefit of the following U.S. Provisional Patent Application:

a. Application No. 60/388,493 entitled "Graphically Rich, Modular, Promotional Tile Interface for Interactive Television", filed Jun. 12, 2002.

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

FIELD OF THE INVENTION

The present invention relates to User Interfaces for Interactive Television, which in one embodiment serves as a set of concepts and information presentation architectures for enabling users of interactive television services to access a range of broadcast and on-demand programming content offered through an interactive television network, and made available via applications that may execute on a set-top box.

BACKGROUND

In the past few years, home entertainment has evolved from purely one-way radio and television broadcasts to include two-way communication that encompasses interactive games, video on demand (VOD), educational fare and consumer-oriented services (e.g., interactive shopping). For the most part, these services have been offered through familiar cable and satellite television distribution systems.

Broadly speaking, there are two paradigms for using cable and satellite systems in this fashion. One is computer-centric: using an installed satellite or cable feed (perhaps with a cable or telephone network back channel) as a high-bandwidth conduit to bring on-line computing services, such as Internet access, into the home. The second is television-centric: adding interactive functions to television programming.

In general, systems deployed using the television-centric model have been grouped under the label "interactive television" or iTV. iTV is generally understood as the convergence of Internet-like interactivity and traditional television programming and delivery technology. Making television interactive involves the addition of responsive, user-controlled elements to traditional broadcast video and audio signals. By adding a computer like device (usually referred to as a set-top box) to the television set and providing a communication path back to the service provider (the back channel), the viewer can be invited to interact with the programming, exert some level of control over the experience and to provide feedback.

iTV services are usually delivered to subscribers' homes through an existing cable or satellite system, along with other free and pay-for content (e.g., movies, games, news, images, audio programming, etc.). This content is generally delivered to the television via a set-top box, and users may navigate the offered services using a remote control and on-screen navigation system or menu. The set-top box is an addressable communications unit needed to decode signals as they arrive at the television. Depending on the system used it may also need to perform functions such as the decompression of the digital signal, or the handling of communications across the back channel. Together with a (typically handheld) remote control and on-screen menu, this unit provides an interface for users to find their way through the myriad of content and services offered and communicated to their television sets by the iTV system provider.

To illustrate, consider the case of a user ordering a pay-per-view movie. Using a remote control the user can select the desired service via the on-screen menu displayed on his or her television set. This request is sent via the back channel to the service provider's control system, which locates the required content and delivers it via a cable or satellite transmission system to the set-top box for decoding and display on the user's television. Along the way, a subscriber management system may be informed of the user's selection so that the user's account can be updated to reflect any relevant charges for the selected movie.

The on-screen menu may or may not be overlaid on top of the television picture. Common examples of on-screen menus include electronic program guides (EPGs), electronic catalogs, and advertising information. Television program guides have matured rapidly in recent years. At one time the only TV program guides available were those printed in newspapers and magazines. These guides typically had a grid with list of channels, showing the programming for those channels as a function of time. They also sometimes contained synopses of movies or television shows scheduled to be aired.

The advent of cable television systems brought on-screen EPGs. The early versions consisted of a dedicated channel displaying a program guide that showed the current (and perhaps limited future) programming for most or all channels. Since there is only space to show half a dozen or so channels on the screen at a time, the display would automatically scroll through all the available channels.

Today, however, many cable companies utilize set-top boxes to provide interactive EPGs that support advanced features such as the ability to call up a program guide grid at any time, and scroll through channels and programming forward and backward in time via a remote control. Usually information on programming for some days into the future is made available. In addition, modern EPGs can display lists of channel numbers, program titles and even program durations, appearing briefly each time the channel is changed, and at other times by selecting a corresponding option on the remote control. Textual descriptions of any program listed in the program grid, or of the current program being viewed, can be called up by using the remote control, and a user can change channels automatically by clicking on a program title as it is displayed in the program grid.

In addition to EPGs, popular iTV offerings include:

A. TV Portals. Influenced no doubt by the analogy to popular Internet "portals" such as AOL and Yahoo, many think of a television (TV) portal as a non-video, non-broadcast, "Internet-like" page on TV. Contrary to this popular opinion, however, a TV portal is actually an application "window" into the world of interactivity that links various forms of services, including walled gardens (also known as managed content) that may contain video, text and image assets, delivered via both broadcast and narrowcast, virtual channels, interactive program guides (IPGs), enhanced TV broadcasts, video on demand (VOD) content and more. In fact, many interactive experiences can originate from the TV portal or users come into the TV portal for additional content and services. Thus, the portal may be accessed through a navigation overlay on top of regular broadcasts or through an IPG, virtual channel or enhanced programming.

Network operators, programmers and content producers have an opportunity to custom brand the content areas of TV portals, providing them with a foundation for offering interactive services and enabling new revenue streams. A portal can contain a controlled set of valuable, aggregated content and merchant sites accessible by consumers. Portal participants can consist of e-commerce providers, such as home shopping, home banking and brokerage services; various news services; weather and sports information providers; as well as advertisers, TV programmers and other content producers.

Managed content designed for a TV environment can be linked to the TV portal, forming an interactive experience that combines the convenient, audio-visually entertaining medium of TV with the immediate information access and electronic purchasing powers often seen on the Internet. The portal offers a secure environment with a common TV-centric user interface, personalization capabilities and cross-merchant shopping capabilities. Some of the key components of portal content include:

i. Basic Personalized Information—Basic on-demand information services available to end users (subscribers) are based on their preferences and/or profile, including headline news, sports news and scores, local weather, horoscopes, business news and stock quotes.
  ii. Branded Content—Information services in various categories include branded sources such as television networks, which may provide information and entertainment services in portals to augment their regular TV programming.
  iii. Shopping—"T-commerce" or "TV Commerce" includes categories such as books, video, music, gifts, electronics, apparel, travel and toys, as well as advanced shopping features such as comparison shopping, cross-merchant shopping carts and auctions.
  iv. Advertising—Advertising opportunities are widely available throughout the iTV landscape. Unlike Internet portals, which only provide targeted and personalized banner ads, broadband access and the rich medium of TV provide a compelling advertising vehicle, drawing consumers into a TV-centric entertainment experience that drives responses while providing the same targeting and personalization capabilities of the Internet.
  v. Self-provisioning—Through a network operator's TV portal, subscribers can manage their own billing information and preferences, and subscribe to new services including premium services, e-mail, games, video on demand and more.
  vi. Virtual Channels—A virtual channel is a custom-branded TV channel that can be accessed from programming, the main menu or info bar, from a network operator portal, an IPG or by manually selecting a specified channel number (e.g., channel 401). Within such a channel, a TV network, advertiser or content provider can combine a video library with Internet or database content, and on-demand features enable viewers to control their interactions with the information. Thus, virtual channels allow for specific content opportunities for niche audiences, targeted advertising, brand building, and program promotions, as well commerce and subscription revenue streams.

B. Interactive Program Guides (IPGs). The IPG is the navigation tool for TV viewing, allowing viewers to easily search for programming by time, channel, program type, and so on. It is an essential tool for iTV users, especially as the number of channels and other offerings increase. IPGs provide an opportunity for companies to offer an increasingly large amount of data in an easy-to-use interface.

C. Personal Video Recorders (PVRs). PVRs store video programming on an internal hard drive and function like a personalized video server, allowing end-users to "time shift" their TV viewing. While watching live TV, the user can "pause" and "rewind", as well as "fast-forward" to catch up to the live broadcast. PVRs also act as autonomous agents, searching all of the available programming and building a dynamic menu of personalized content choices that the user can access at his/her convenience. Currently most PVRs are stand-alone units, developed and marketed by companies such as TiVo and Replay Networks (now Sonic Blue).

D. Video On Demand (VOD) Services. VOD is essentially server-side time shifting (vs. client-side in the case of PVRs). Users are able to play, pause and rewind videos on their TVs via their remote control. Companies such as Concurrent, Diva, SeaChange and nCube provide VOD server technology.

E. Enhanced TV Broadcasts. Enhanced TV broadcasting provides interactive content linked to video programming. A user can request information on products within ads, access additional program information, such as sports statistics, or otherwise interact with a television broadcast such as a game show. This functionality is achieved through the transmission of an interactive trigger and data sent in the broadcast channel or other mechanism along with the video broadcast. For example, ATVEF (the Advanced Television Enhancement Forum) triggers are messages that arrive at a specific point in time during a broadcast (e.g., via text channel 2 of the closed caption channel carried on line 21 of NTSC video), and are intended to activate specific enhanced content.

Enhanced TV broadcasts can be combined with other services within a unified TV portal, integrating with a walled garden or virtual channel content to leverage robust order processing, fulfillment infrastructure and revenue sharing agreements that may already in place.

F. Other Services. E-mail access, chat functions, music jukeboxes and photo albums are examples of other iTV offerings.

Many of the applications listed above will be presented to end users via a common user interface and order/transaction entry and tracking system. However, each application has specific integration, management and distribution issues that arise depending on the environment that the network operators choose to deploy and significant problems are experienced by application providers and distributors in deploying and managing their iTV applications as a result.

Problem:

The previous overview of various interactive television services illustrates the problem that network operators, programmers, broadcasters and advertisers face in deploying and making easily accessible the vast library of available content in a readily accessible, easy-to-use manner that combines broadcast and on-demand in a smooth way that can blur its distinction and boundary if the user so chooses. Some of the causes that give rise to the difficulty of organizing and presenting content include:

a. the existence of layer upon layer of text based lists that the user must navigate
  b. navigation through the user interfaces is linear
  c. interfaces that do not support the need for preferred placement, promotions or other display rules
  d. lack of richness in the on-demand interface presented to users
  e. the interfaces do not have multiple entry points f. the user interface is static, with no consideration given to the time of day and the particular viewer of the content.

SUMMARY OF THE INVENTION

A user interface arranged as hierarchical grid of tiles configurable to be individually and dynamically programmed for both content type and content placement according to a set of rules defining content placement and display specified by a content controller.

BRIEF DESCRIPTION OF THE DRAWINGS

FIGS. 9a-9f illustrate an example of an informational segment of a set of user interfaces in accordance with an embodiment of the present invention.

FIGS. 10a-10d illustrate premium categories pages of a set of user interfaces in accordance with an embodiment of the present invention.

FIGS. 11a-11f illustrate an entertainment segment of a set of user interfaces in accordance with an embodiment of the present invention.

DETAILED DESCRIPTION

Figure 1:
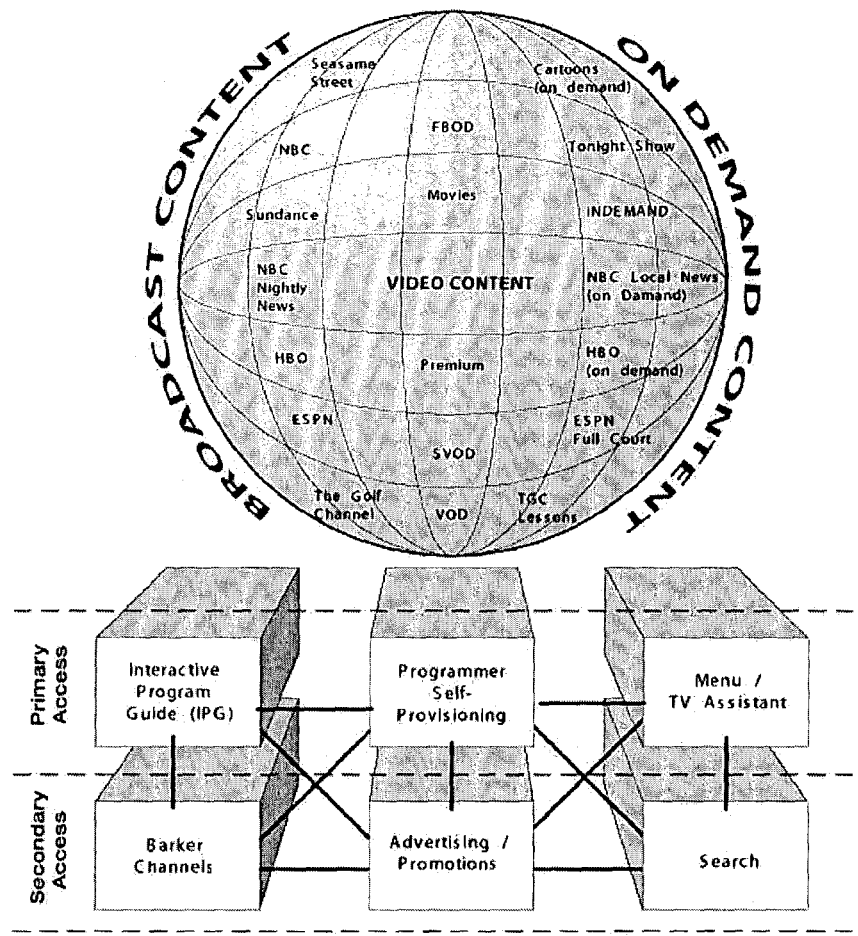
FIG. 1 illustrates conceptually a globe or sphere of broadcast programming and on-demand content, with individual sets of content surfaced for selection and display based on the time of day, the navigation context and the viewer in accordance with an embodiment of the present invention.

Described herein are user interfaces by which, in one embodiment, network operators, programmers, broadcasters and advertisers can easily deploy and make accessible a library of available content in an easy-to-use manner that combines broadcast and on-demand in a smooth way that can blur its distinction and boundary if the user chooses. This solution can be conceptualized by considering all of the content available as objects in an n-dimensional space whose surface denotes the specific elements of content that are brought for selection by the viewer given the time of day and context. In one embodiment, the invention can be visually depicted as a globe or sphere of broadcast programmed and on-demand content, and individual sets of content are surfaced for selection and display based on the time of day, the navigation context and the viewer. The illustration in FIG. 1 expresses this concept.

In this manner, the concept of this invention includes among other things the notion of dynamically shifting the user interface and navigation using time-based demographics. Thus, this invention includes the notion of surfacing different content to different viewers at different times in a novel way.

Some elements of the present user interface include:
  a. user interface methods to dynamically illustrate both the breadth and depth of content available at the same time.
  b. user interface methods that break the limitations of existing linear interfaces as expressed in the problem statement above.
  c. user interface methods to dynamically provide multiple entry points to content.
  d. user interface methods to combine broadcast programming and on-demand content in a smooth way that provides a very subtle transition to related on-demand content.
  e. user interface methods for time-shifted user interfaces, present different content selections to viewers based on time of day.
  f. user interface methods wherein the viewer is presented different content selections based on the current broadcast content, to enhance the current broadcast and extend the content bandwidth.
  g. user interface methods that consist of tiled interfaces on the TV screen to present various content selections.
  h. tiled user interfaces wherein the screen can be divided dynamically into different groupings of tiles, where the tiles have different sizes.
  i. tiled user interfaces consisting of groupings of grids of tiles wherein each grouping may be further sub-divided into more granular groupings of smaller tiles, based on navigation flow and business rules. These groupings may be individually scrollable using a remote control device.
  j. tiled user interfaces wherein the transition between different tiled groupings on the screen can be dynamically controlled.
  k. tiled user interfaces wherein the number of tiles in each screen grouping can be dynamically controlled.
  l. tiled user interfaces wherein the tiled screen groupings can be configured at a prior time and dynamically selected using business rules.
  m. tiled user interfaces wherein individual placement and content of tiles within a group can be controlled dynamically using business rules.
  n. tiled user interfaces wherein business rules can be specified to:
    i. dynamically control content of each tile
    ii. dynamically control placement of each tile (preferred placement)
  o. tiled user interfaces wherein business rules can be based on:
    i. time of day
    ii. channel iii. current broadcast content
iv. preferred placement of content
v. viewer demographic
vi. viewer behaviour
vii. navigation context
viii. current content category
p. tiled user interfaces wherein the content of tiles can be dynamically controlled to include:
  i. channel logos
  ii. specific program logos or brands, including images (e.g. Sopranos logo, or The West Wing image)
  iii. Images of people and things Examples of various embodiments of the above features are given below to clarify the specific types of user interface treatments that can provide the above named features. For example, in one embodiment the user interface and navigation can consist of the following sequence of tiled screens:
  i. Dividing the screen into a grid of thirds.
  ii. Each third is dynamically divided into further sub-groupings which are themselves grids of tiles. The content of each tile can be dynamically controlled based on business rules
  iii. Each grouping or grid of tiles can be individually scrolled or tiles selected using the remote control device Such an example is illustrated by the screens shown in FIGS. 2a and 2b.

Figure 2A:
FIG. 2a illustrates an example of a top level Entertainment grid of a user interface in accordance with an embodiment of the present invention.
Figure 2B:
FIG. 2b illustrates an example of navigation to a next-level detail grid within the Entertainment section of a user interface in accordance with an embodiment of the present invention.

FIG. 2a illustrates an example of a top level Entertainment grid. FIG. 2b illustrates an example of navigation to a next-level detail grid within the Entertainment section. Collectively, these illustrations provide an embodiment of features a, b, c, e, g, h, i, j, k, l, m, n, o, and p above.

Figure 3:
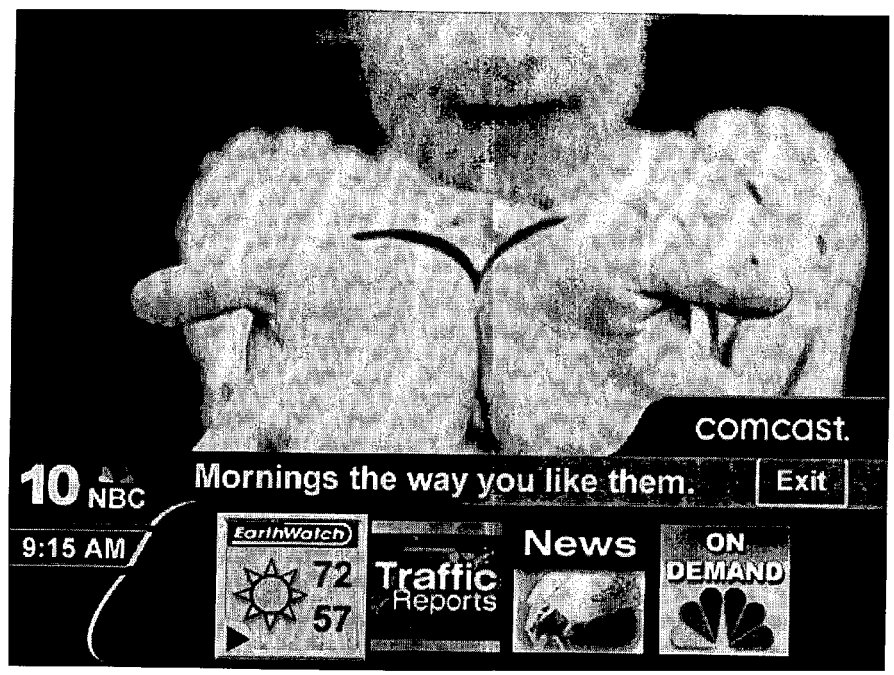
FIG. 3 illustrates an example of a channel dependent, time-of-day based, tiled user interface of a user interface in accordance with an embodiment of the present invention.

In the embodiment illustrated in FIG. 3, a channel assistant user interface may extend the current broadcast content by presenting an interactive bar consisting of several components including time-sensitive messages and a tiled grid based on time of day that presents the viewer with additional selections for on-demand content supplemental to the broadcast or promoted by the broadcaster, programmer or network operator. Specifically, FIG. 3 illustrates an example of channel dependent, time-of-day based, tiled user interface that extends the current broadcast This example provides an embodiment of features a, b, c, d, e, f, g, i, k, l, m, n, o, and p above.

Figure 4A:
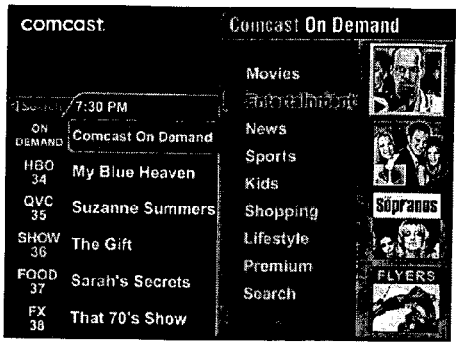
FIG. 4a shows an interactive program guide plus On Demand view of a user interface of a user interface in accordance with an embodiment of the present invention.
Figure 4B:
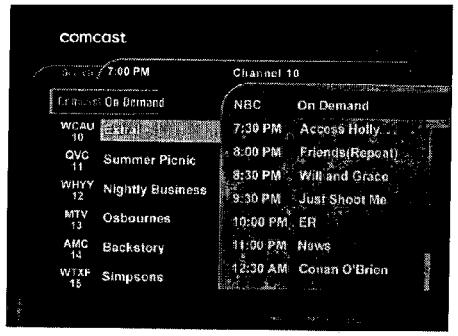
FIG. 4b shows an interactive program guide plus On Demand—Broadcast View of a user interface of a user interface in accordance with an embodiment of the present invention.
Figure 4C:
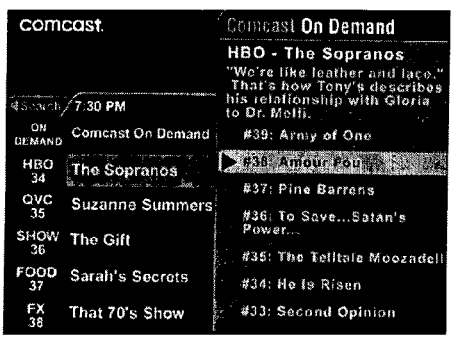
FIG. 4c shows an interactive program guide plus On Demand—On Demand view of a user interface of a user interface in accordance with an embodiment of the present invention.

In the embodiment shown in FIG. 4, the viewer is presented with a combination of broadcast and on-demand content selections in an easy-to-use manner that makes the vast library of available on-demand content readily accessible, combining broadcast and on-demand in an intuitive way. FIG. 4a shows an interactive program guide plus On Demand. FIG. 4b shows an interactive program guide plus On Demand— Broadcast View. FIG. 4c shows an interactive program guide plus On Demand—On Demand view. FIGS. 4a, 4b and 4c also provide an embodiment of features a, b, c, d, e, g, h, k, l, m, n, o, and p above.

In a further embodiment the present invention assists cable operators by facilitating access to on-demand technologies, which are the key to increasing a cable operator's core subscription business of premium channels and digital cable. VOD will be the cornerstone of these on-demand technologies. VOD will dramatically change the television viewing experience because of the depth of choice it provides. Rather than choosing from 3 or 4 scheduled children's programs at 3:00, customers will be able to choose from hundreds of hours of program options. The following represents some benefits provided by the present user interface:
  i. Show breadth and depth of on-demand content.
  ii. Break the limitation of the existing linear user interfaces.
  iii. Illustrate crystallizing cases for all types of on-demand content (VOD, SVOD, FBOD, LOD).
  iv. Showcase multiple entry points (IPG, Menu/TV Assistant, Ads, Managed Content Service, Personal Channels, etc).
  v. Provide promotional opportunities.
  vi. Illustrate the mixing of broadcast and on-demand content.

Through the present user interface, thousands of hours of video programming can be available to the subscriber at any given moment. The combination of all this video content will increase the subscribers' perceived value and reduce churn. The thousands of hours of video may be categorized time-based demographics. These demographics will help the user quickly find the content they want as well as enable the cable operator to categorize and promote video content based on the users preferences and history. The user interfaces will support the operator's desires for self-provisioning, parental controls, spending limits and account access.

In the future, operators will house thousands of hours of video content that will be organized and categorized in many ways including by network affiliation, genre (news, comedy, drama), length, age range, free vs. paid, etc. At any time of the day the user interface will change to reflect the user habits of the operator's subscribers and offer the video content the subscriber is looking for quickly. The analogy is that of a large sphere of video content that rotates at specific times to promote specific video content types and genres as shown in FIG. 1.

One key is to show how many different types of content (video, text, graphics, advertising) can be organized and promoted through a similar user experience. There are many ways to categorize the various types of content, in one embodiment we have narrowed the types of content into 3 groups. The 3 experiences are based on the type of content a user may want at any given time. They are as follows:
  a. Utility—Service related content/programming that provides the viewer small snippets of information to help them with daily tasks. Types of Utility content may include on-demand traffic reports, weather reports and news reports.
  b. Informational—Content/programming related to activities and self-interest a subset of which may include self-improvement or self-education. Types of Informational content may include cooking lessons, golf lessons, adult education, history and news.
  c. Entertainment—Entertainment based content/programming. Enhanced versions of existing models focusing on movies-on-demand, VOD, SVOD, self-provisioning, etc. Types of Entertainment content may include movies, premium services and subscription services.

Figure 5:
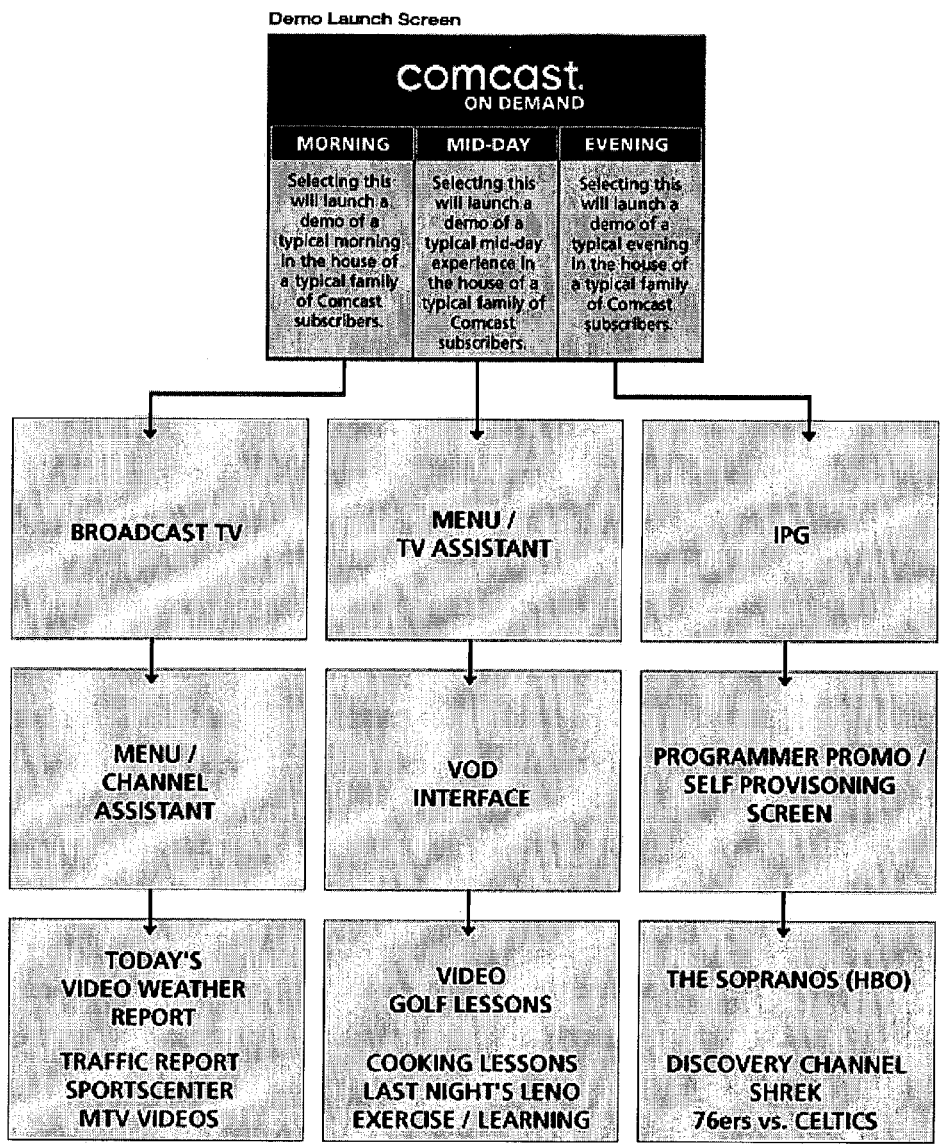
FIG. 5 is a conceptual representation of the initial screens of the example of the present user interface

For these experience types, we model the embodiment after the usage habits and needs of a typical family on a typical day. To keep to an 8-10 minute duration (for this embodiment), we have chosen to focus on the family's experience at 3 times periods in the day. Each time will represent a different set of needs or desires for the family. These times and their corresponding types will be morning (utility), mid-day (informational) and evening (entertainment). Each time and need is described in more detail in the following sections. FIG. 5 is a conceptual representation of the initial screens of the example of the user interface but does not represent the storyboard or all the navigation options.

The following describes each of the 3 demonstration paths and the types of experiences associated with each. In each case we have attempted to address the entry point, featured content, scenarios and promotional content. At the bottom of each section, the desired video content is listed. When possible, secondary content choices have been listed.

Demo Path #1 (Utility)
a. Time of Day: 6:00 AM to 9:00 AM
b. Users: Entire Family
c. Entry Point: TV Assistant
d. Featured Content Types: Utility (in the form of services)
  i. Local Weather (TVA or Weather Channel FOD)
  ii. Sports Scores (TVA)
  iii. Sports Recap (FOD)
  iv. Local News (FOD)
  v. Music Videos (FOD)
  vi. Sesame Street (FOD)
  vii. VOD
  viii. Kids Short Form (Cartoons)
  ix. Kids Programming (Blues Clues, Oswald)
  x. Kids Movies (Rug Rats in Paris)

Scenarios:
The family is starting their day and wants specific content types based on the day ahead or their interests. Each role is described in more detail below:
  a. Mother: She wants to catch the headlines that she missed last night and check to see the weather to make sure the kids are wearing the right clothes.
  b. Father: He wants to see last night's final scores and is traveling to New York so he wants to check the weather in New York before he leaves.
  c. Teenager: Wants to see her favorite music videos.
  d. Toddler: Wants to watch Oswald or Sesame Street.

Promotional Examples:
a. Cooking Lessons (SVOD)
b. Golf Lessons (SVOD)
c. Personal Channels (PC→SVOD)
d. Movies (MOD)

TABLE 1

Content Ingredients/Wish List for Demo Path #1

| Primary | Secondary |
| --- | --- |
| Comcast ID/Commercials | N/a |
| NBC Local | ABC/CBS/FOX Local |
| MTV | VH1 |
| 76ers/Flyers/Phillies | ESPN/FOX Highlights |
| Movies/Comedy (MOD) | Movies/Family (MOD) |
| Nickelodeon | Cartoon Network/Disney Channel |

Demo Path #2 (Informational)
a. Time of Day: 9:00 AM to 5:00 PM
b. Users: 9:00 AM to 3:00 PM Stay at Home Parents and Pre-schoolers
c. 3:00 PM to 5:00 PM After School Kids
d. Entry Point: Personal Channels (via the managed content service)
e. Featured Content Types: Informational (in the form of activities or SVOD)
  i. Personal Channels (Services FOD→SVOD)
  ii. Cooking Lessons (SVOD)
  iii. Golf Lessons (SVOD)
  iv. Home Improvement (SVOD)
  v. Sesame Street (FOD)
  vi. Clifford the Big Red Dog (FOD)
  vii. Adult Education/Job Training (FOD/SVOD)
  viii. Music Videos (FOD)—After School
  ix. VOD
  x. Kids Programming (Blues Clues, Oswald)
  xi. Kids Movies (Rug Rats in Paris)
  xii. Adult Movies (Life as a House, Riding in Cars with Boys)
  xiii. Teen Movies (Shrek, Atlantis: The Lost Empire)—After School Scenarios:
The family has left for work or school. A parent and/or child are at home and the parent looks to the service for self-help and growth. The parent makes decisions based on content that interests them and they will not have an opportunity to watch when the rest of the family is at home. In this scenario there is more time to browse and search for the type of content that will be fulfilling to that individual. Later in the afternoon, the kids start to return from school. These kids may be alone or with parents. They are looking for entertainment that is focused on them and their parents have allowed them to view (with parental controls). Each role is described in more detail below:
  a. Mother: Assumed to be stay at home parent—Wants to improve golf swing and learn how to make rack-of-lamb. She is also looking for the best way to refurbish the old table they bought at the flea market this last weekend.
  b. Father: Talks about the big PPV fight with his coworkers and decides to see if he can watch it tonight when he gets home.
  c. Teenager: Wants to see her favorite music videos and watch a movie before the parents come home from work.
  d. Toddler: Wants to watch Oswald or Sesame Street.

Promotional Examples:
a. PPV Events (SVOD)
b. iNDEMAND Sports Packages (SVOD)
c. Premium Channel (Self Provisioning)
d. Movies (MOD)

TABLE 2

Content Ingredients/Wish List for Demo Path #2

| Primary | Secondary |
| --- | --- |
| Comcast ID/Commercials | N/a |
| NBC Local | ABC/CBS/FOX Local |
| E! | Comedy Central |
| Discovery | Biography/History |
| 76ers/Flyers/Phillies | ESPN/FOX Highlights |
| Golf | ESPN Profiles |
| QVC | HSN |
| Movies/Comedy (MOD) | Movies/Family (MOD) |
| HBO | Showtime |
| Comedy Central | Atom Films |
| Nickelodeon | Cartoon Network/Disney Channel |
| Atom Films | Sundance |

Demo Path #3 (Entertainment)
a. Time of Day: 5:00 PM to 12:00 AM
b. Users: 5:00 PM to 9:00 PM After Work/Prime Time
c. 9:00 PM to 12:00 AM Adult Entertainment
d. Entry Point: Interactive Program Guide
e. Featured Content Types: Entertainment
  i. Local News Recap (TVA/POD)
  ii. Sports Recap (TVA/POD)
  iii. NBC Today Show (FOD)
  iv. Self-Provisioning
  v. Order HBO
  vi. Order Showtime
  vii. PPV
  viii. MOD
  ix. VOD
  x. Last Nights TV Shows
  xi. Old PPV
  xii. Movies by Genre xiii. Search xiv. Adult Scenarios: Everyone is at home again. Similar to the morning, each family member wants specific content types based on their interests. The parent will want to catch up on current events in either news or sports and plan their evening. They will be searching for programming to watch and will want a guide that helps them get to the content they are interested quickly. As the evening moves on, the kids go to bed and the programming is geared specifically to the adults. Each role is described in more detail below:

a. Mother: Wants to watch a replay of the morning shows and get a recap of the news for that day. Later she orders HBO to watch Sex in the City.

b. Father: Orders a VOD replay of the PPV boxing match from the night before. Then orders ESPN Personal Channel for game highlights and commentary.

c. Teenager: Wants to watch a movie before going to bed.

d. Toddler: Is getting ready for bed.

Promotional Examples:

a. PPV Events (SVOD)

b. iNDEMAND Movies (Self Provisioning)

c. Premium Channel (Self Provisioning)

d. Movies (MOD)

TABLE 3

Content Ingredients/Wish List for Demo Path #3

| Primary | Secondary |
| --- | --- |
| Comcast ID/Commercials | N/a |
| NBC Local | ABC/CBS/FOX Local |
| E! | Comedy Central |
| Discovery | Biography/History |
| 76ers/Flyers/Phillies | ESPN/FOX Highlights |
| Movies/Comedy (MOD) | Movies/Family (MOD) |
| HBO | Showtime |
| Comedy Central | Atom Films |
| Atom Films | Sundance |

Figure 6:
FIG. 6 illustrates an example of a launch screen in accordance with an embodiment of the present invention.

FIG. 6 illustrates an example of a launch screen from which any of the Demo paths above could originate.

Figure 7B:
FIG. 7b illustrates a weather on demand view in accordance with an embodiment of the present invention
Figure 7A:
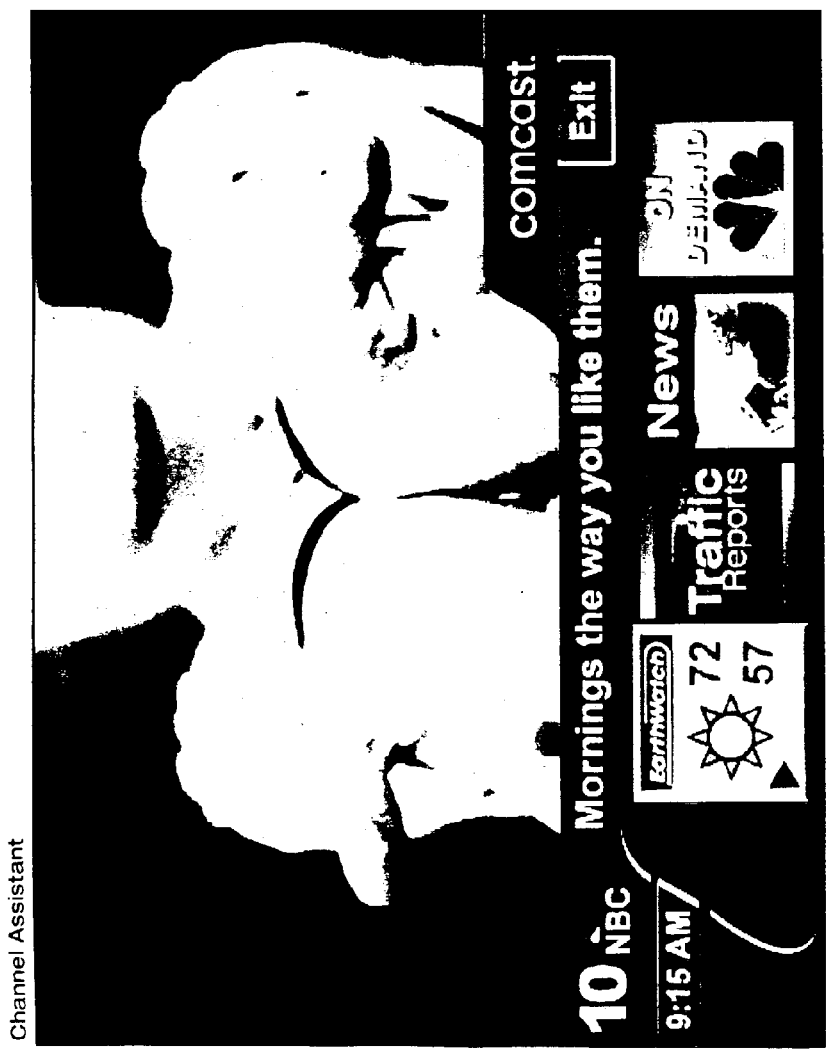
FIG. 7a illustrates an example of the channel assistant screen in accordance with an embodiment of the present invention.
Figure 8C:
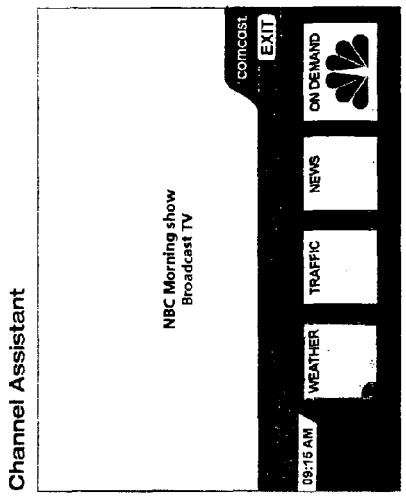
FIGS. 8a-8e illustrate an example of a utility segment of a set of user interfaces in accordance with an embodiment of the present invention.
Figure 8B:
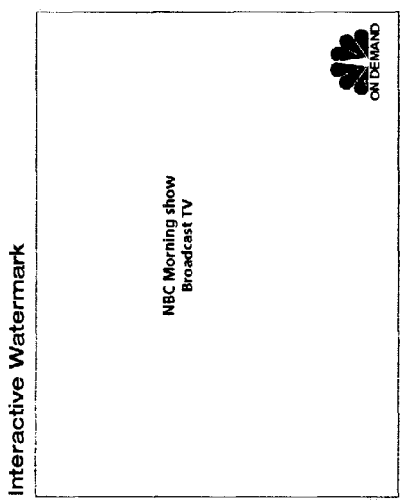
Figure 8E:
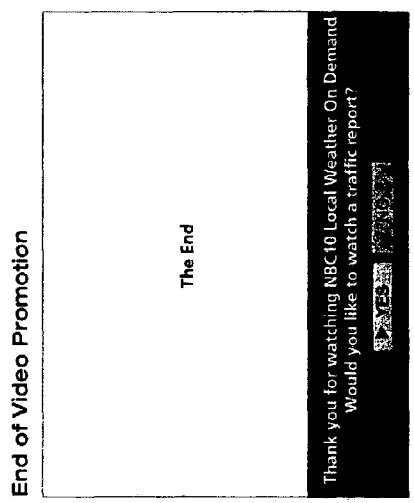
Figure 8A:
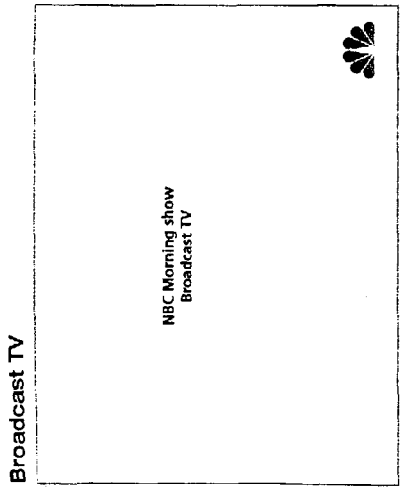
Figure 8D:
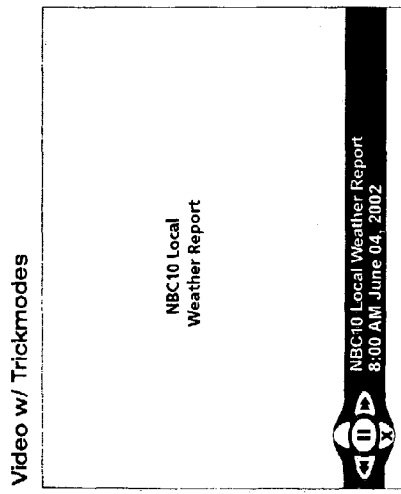
Figure 9A:
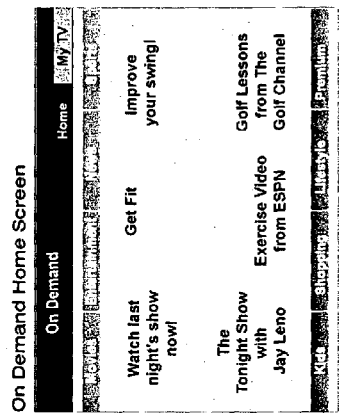
Figure 9C:
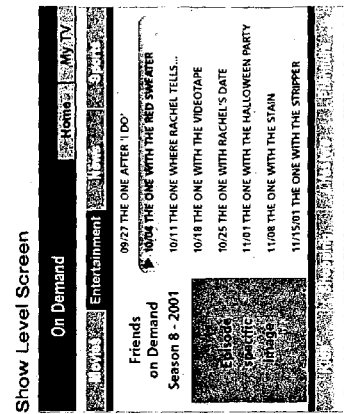
Figure 9B:
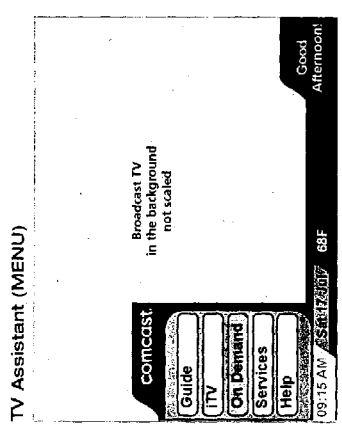
Figure 9E:
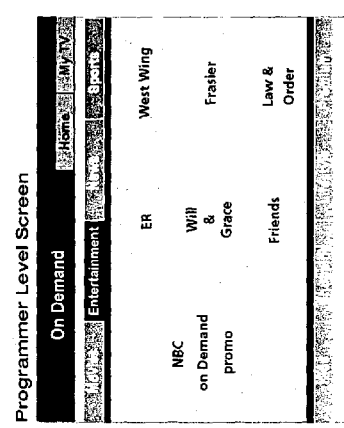
Figure 9D:
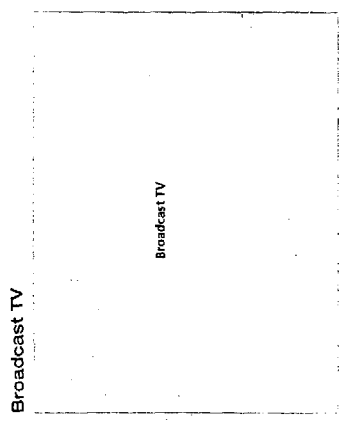

FIG. 7a illustrates an example of the channel assistant screen, providing an entry point for utility content (such as weather on demand shown in FIG. 7b).

FIGS. 8a-8e illustrate an example of a utility segment as discussed above. Selecting an interactive channel watermark (FIG. 8b) would pop up the channel assistant (FIG. 8c), which contains direct access to on-demand content specific to that channel. This is useful for increased access to on-demand programming as well as access points into the more broad on-demand programming that is available.

FIGS. 9a-9f illustrate an example of the informational segment using a video on-demand interface. The user would access the VOD interface by pressing a MENU or similar button on a remote control. Inside the VOD interface there are numerous promotional opportunities as well as the traditional categorization.

FIGS. 10a-10d illustrate premium categories pages that may be used to upsell customers to premium channels (e.g., HBO). While still in the VOD interface, the user can select My TV to view account status as well as receive recommendations for programming similar to that they have previously selected.

FIGS. 11a-11f illustrate an entertainment segment utilizing the interactive program guide interface. The customer would access this interface by pressing GUIDE or a similar button on a remote control. This interface shows how regularly scheduled broadcast programming could co-exist with on-demand programming.

What is claimed is:

1. An apparatus comprising:
 a communications device configured to:
  generate a user interface comprising a plurality of user interface screens, wherein at least one of the user interface screens comprises a plurality of tiles, and one or more of the plurality of tiles identifies programming available for display;
  control the user interface to present a different one of a plurality of entry points to the user interface based on a viewer demographic selected among a plurality of viewer demographics, the viewer demographic being selected based at least in part on a time of day, wherein each different entry point comprises a different set of programming functions and a different initially displayed one of the user interface screens arranged in a plurality of levels; and
  output one of the user interface screens.

2. The apparatus of claim 1, wherein the plurality of user interface screens includes a channel assistant for accessing programming content.

3. The apparatus of claim 1, wherein the plurality of user interface screens comprises an interactive program guide (IPG) for accessing entertainment programming content.

4. The apparatus of claim 1, wherein the plurality of user interface screens comprises an interactive channel watermark displayed over programming of a currently displayed channel, and wherein the communications device is configured to generate a displayable pop up channel assistant in response to a selection of the interactive channel watermark, and wherein the displayable pop up channel assistant is configured to provide access to on-demand programming content associated with the currently displayed channel.

5. The apparatus of claim 1, wherein the communications device is further configured to select the plurality of tiles to display within one of the plurality of user interface screens based on the selected viewer demographic.

6. The apparatus of claim 1, wherein the communications device is configured to arrange the plurality of tiles within one of the user interface screens in a shape of at least one of a globe and a sphere, and wherein the shape is configured to change based on a time of day to reflect a user's habits by rotating to promote specific programming content types and genres.

7. The apparatus of claim 1, wherein at least one of the plurality of tiles displayed in one of the user interface screens is divided into a group of additional tiles displayed in place of the one tile within the one user interface screens based on business rules.

8. The apparatus of claim 7, wherein the group of additional tiles displayed in place of the one tile is individually scrollable.

9. The apparatus of claim 1, wherein the communications device includes a set-top box.

10. The apparatus of claim 1, wherein one of the tiles identifies video programs available from the same source.

11. The apparatus of claim 1, wherein controlling the user interface comprises providing access to video content that is categorized based at least in part on time-based demographics.

12. A method comprising:
 generating, by a computing device, a user interface comprising a plurality of user interface screens, wherein at least one of the user interface screens comprises a plurality of tiles, and one or more of the plurality of tiles identifies programming available for display;

controlling the user interface to present a different one of a plurality of entry points to the user interface based on a viewer demographic selected among a plurality of viewer demographics, the viewer demographic being selected based at least in part on a time of day, wherein each different entry point comprises a different set of programming functions and a different initially displayed one of the user interface screens arranged in a plurality of levels; and outputting one of the user interface screens.

13. The method of claim 12, wherein the plurality of user interface screens includes a channel assistant for accessing utility programming content.

14. The method of claim 12, wherein the plurality of user interface screens include an interactive program guide (IPG) for accessing entertainment programming content.

15. The method of claim 12, further comprising:

generating a displayable pop up channel assistant in response to a selection of an interactive channel watermark displayed over programming of a currently displayed channel, the displayable pop up channel assistant providing access to on-demand programming content associated with the currently displayed channel.

16. The method of claim 12, further comprising:

selecting the plurality of tiles to display within one of the plurality of user interface screens based on the selected viewer demographic.

17. The method of claim 12, wherein the outputted user interface screen is overlayed on content of a currently displayed channel, and wherein the overlayed user interface screen includes a tile identifying an on-demand program associated with the currently displayed channel.

18. The method of claim 12, wherein the entry points include an interactive program guide displayed as an initial user interface screen at a first time of day, and a channel assistant displayed as the initial user interface screen at a second time of day.

19. The method of claim 17, wherein the on-demand program includes weather reports associated with the currently displayed channel.

20. The method of claim 12, wherein one of the user interface screens includes a program guide displaying lists of content organized by channel, each list associated with a different channel and including on-demand content available any time from the associated channel listed with broadcast content available at scheduled times from the associated channel.

21. The method of claim 20, wherein the on-demand content includes previously broadcast episodes of the broadcast content available at the scheduled times.

22. The method of claim 12, wherein controlling the user interface comprises providing access to video content that is categorized based at least in part on time-based demographics.

23. A method comprising:

generating, by a computing device, a user interface comprising a plurality of menus identifying different video programming available for display;

modifying the user interface to organize the plurality of menus into different hierarchies based on a time of day, wherein each different hierarchy comprises a different initially displayed menu of the user interface, and wherein each said initially displayed menu comprises a different set of programming functions; and outputting at least one of the plurality of menus of the user interface, wherein contents of the at least one outputted menu are selected based on a viewer demographic selected from a plurality of different viewer demographics, the viewer demographic being selected based at least in part on the time of day.

24. The method of claim 23, wherein modifying the user interface comprises providing access to video content that is categorized based at least in part on time-based demographics.

* * * * *

UNITED STATES PATENT AND TRADEMARK OFFICE
CERTIFICATE OF CORRECTION

PATENT NO. : 8,707,354 B1  
APPLICATION NO. : 10/460950  
DATED : April 22, 2014  
INVENTOR(S) : Samuel Moreau et al.

Page 1 of 1

It is certified that error appears in the above-identified patent and that said Letters Patent is hereby corrected as shown below:

In the Claims

Column 12, Claim 1, Line 6:
    Delete "communications" and insert --computer--

Signed and Sealed this
Tenth Day of February, 2015

Michelle K. Lee
*Deputy Director of the United States Patent and Trademark Office*